United States Patent
Hall et al.

(10) Patent No.: US 9,875,228 B1
(45) Date of Patent: Jan. 23, 2018

(54) SYSTEMS AND METHODS FOR PRESERVING CONDITIONAL STYLES WHEN COPYING AND PASTING BETWEEN APPLICATIONS

(71) Applicant: Google Inc., Mountain View, CA (US)

(72) Inventors: Lindsay Grace Hall, Brooklyn, NY (US); Jeffrey de Blanc Palm, New York, NY (US); Luiz do Amaral de Franca Pereira Filho, Jersey City, NJ (US); Steven Joseph Saviano, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 398 days.

(21) Appl. No.: 14/641,278

(22) Filed: Mar. 6, 2015

(51) Int. Cl.
 *G06F 17/24* (2006.01)
(52) U.S. Cl.
 CPC ................. *G06F 17/246* (2013.01)
(58) Field of Classification Search
 CPC ...................................................... G06F 17/24
 See application file for complete search history.

(56) References Cited

U.S. PATENT DOCUMENTS

| | | | | |
|---|---|---|---|---|
| 6,933,919 B1 * | 8/2005 | Anderson | ............... | G06F 3/033 345/156 |
| 7,596,747 B2 | 9/2009 | Spada | | |
| 8,572,482 B2 | 10/2013 | Yuan et al. | | |
| 8,667,411 B2 | 3/2014 | Miyoshi | | |
| 2004/0103376 A1 * | 5/2004 | Pandey | ................. | E21B 41/00 715/211 |
| 2006/0069635 A1 * | 3/2006 | Ram | ...................... | G06Q 30/08 705/37 |
| 2006/0192772 A1 * | 8/2006 | Kambayashi | ....... | G06F 3/03545 345/179 |
| 2007/0050700 A1 | 3/2007 | Simkhay et al. | | |
| 2007/0156998 A1 * | 7/2007 | Gorobets | ............ | G06F 12/0246 711/170 |
| 2007/0234209 A1 * | 10/2007 | Williams | ............ | G06F 3/04842 715/700 |

(Continued)

OTHER PUBLICATIONS

Cheusheva, "Alternating row colors and column shading in Excel (banded rows and columns)," AbleBits; <https://www.ablebits.com/office-addins-blog/2014/03/13/alternate-row-column-colors-excel/>; Published prior to Mar. 16, 2014 (14 Pages).

(Continued)

*Primary Examiner* — Scott Baderman
*Assistant Examiner* — Mario M Velez-Lopez
(74) *Attorney, Agent, or Firm* — Lowenstein Sandler LLP

(57) ABSTRACT

Systems and methods are disclosed herein for copying inherited properties between electronic documents. An input to copy a source child element from a source application editing a source document is received. The source child element inherits a value of a property from another element. An input to paste the copied element into a destination document edited by destination application is received. The copied element is pasted into the destination document. The destination application retrieves instructions to determine a destination child value of the property and uses the instructions to determine the destination child value. The destination child value is consistent with the value which would have been determined had the copied element been pasted into the source document.

20 Claims, 10 Drawing Sheets

(56) References Cited

U.S. PATENT DOCUMENTS

| | | | |
|---|---|---|---|
| 2008/0301560 A1 | 12/2008 | Rogers et al. | |
| 2009/0044121 A1* | 2/2009 | Berger | G06F 3/0486 715/724 |
| 2009/0182791 A1* | 7/2009 | Gorobets | G06F 12/0246 |
| 2009/0292994 A1* | 11/2009 | Lwo | G06F 9/543 715/733 |
| 2010/0005169 A1* | 1/2010 | Von Hilgers | G06Q 10/00 709/224 |
| 2010/0251093 A1* | 9/2010 | Broman | G06F 17/24 715/227 |
| 2011/0153601 A1* | 6/2011 | Nakazawa | G06F 17/3069 707/723 |
| 2011/0173555 A1* | 7/2011 | Miyoshi | G06F 17/24 715/770 |
| 2014/0250369 A1* | 9/2014 | Mitnick | G06F 17/24 715/235 |
| 2017/0090734 A1* | 3/2017 | Fitzpatrick | G06F 3/04845 |

OTHER PUBLICATIONS

Control the Formatting When You Paste Text, downloaded form the internet on Dec. 2, 2014 at: https://support.office.com/en-nz/article/Control-the-fromatting-when-you-paste-text-20156a41-520e-48a6-8680-fb9ce15bf3d6, 9 pages.

* cited by examiner

SYSTEMS AND METHODS FOR PRESERVING CONDITIONAL STYLES WHEN COPYING AND PASTING BETWEEN APPLICATIONS

FIELD OF THE INVENTION

In general, this disclosure relates to resolving conditional styles when copying and pasting elements of electronic documents between applications.

BACKGROUND

Elements of electronic documents can have conditional formatting, meaning that one or more properties of the elements have values that are determined based on the position of the elements within the document, or by reference to other elements. When copying and pasting such elements between applications, problems may arise if the source and destination applications determine values for these conditionally formatted properties in different manners. In particular, if the source application supports conditional formatting for a property but the destination application does not, the conditional formatting may be lost after pasting.

SUMMARY

Accordingly, systems and methods are described herein for preserving conditional styles when copying and pasting between applications. A user input is received to copy a source child element of a source electronic document. The source child element inherits a source child value of a property from a source parent value associated with a source parent element of the source electronic document. Clipboard data is copied. The clipboard data includes data associated with the source child element and a source file type associated with the source document. A user input is received to paste the source element into a destination electronic document. A destination file type associated with the destination electronic document is determined. The destination file type is different from the source file type. Instructions, which are based on the destination file type, are received to determine a first destination child value of the property from a destination parent value associated with a destination parent element of the destination electronic document. The clipboard data is pasted into the destination electronic document. The retrieved instructions are executed to determine a first destination child value of the property. The destination electronic document is rendered for display, based on the first destination child value of the property.

In some aspects, the source child element includes a table.

In some aspects, the table comprises cells arranged in a rectangular grid. The property is associated with at least one cell. The source child value is determined based on the position of the at least one cell within the rectangular grid.

In some aspects, a second user input is received to modify the pasted clipboard data in the destination electronic document. The retrieved instructions are executed to determine a second destination child value of the property different from the first destination child value. Based on the second destination child value of the property, the destination electronic document is rendered for display.

In some aspects, the second user input to modify the spreadsheet includes an input to modify the number of cells in the table.

In some aspects, the retrieved instructions are the same as the instructions used in the source document.

In some aspects, the source child value is determined based on a second source child value associated with a second cell within the rectangular grid.

In some aspects, the source child value is determined based on the position of the at least one cell relative the second cell within the rectangular grid.

In some aspects, clipboard data including the instructions is copied. The instructions are retrieved from the clipboard data.

In some aspects, the instructions are retrieved from an application editing the destination electronic document.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

Figure 1:
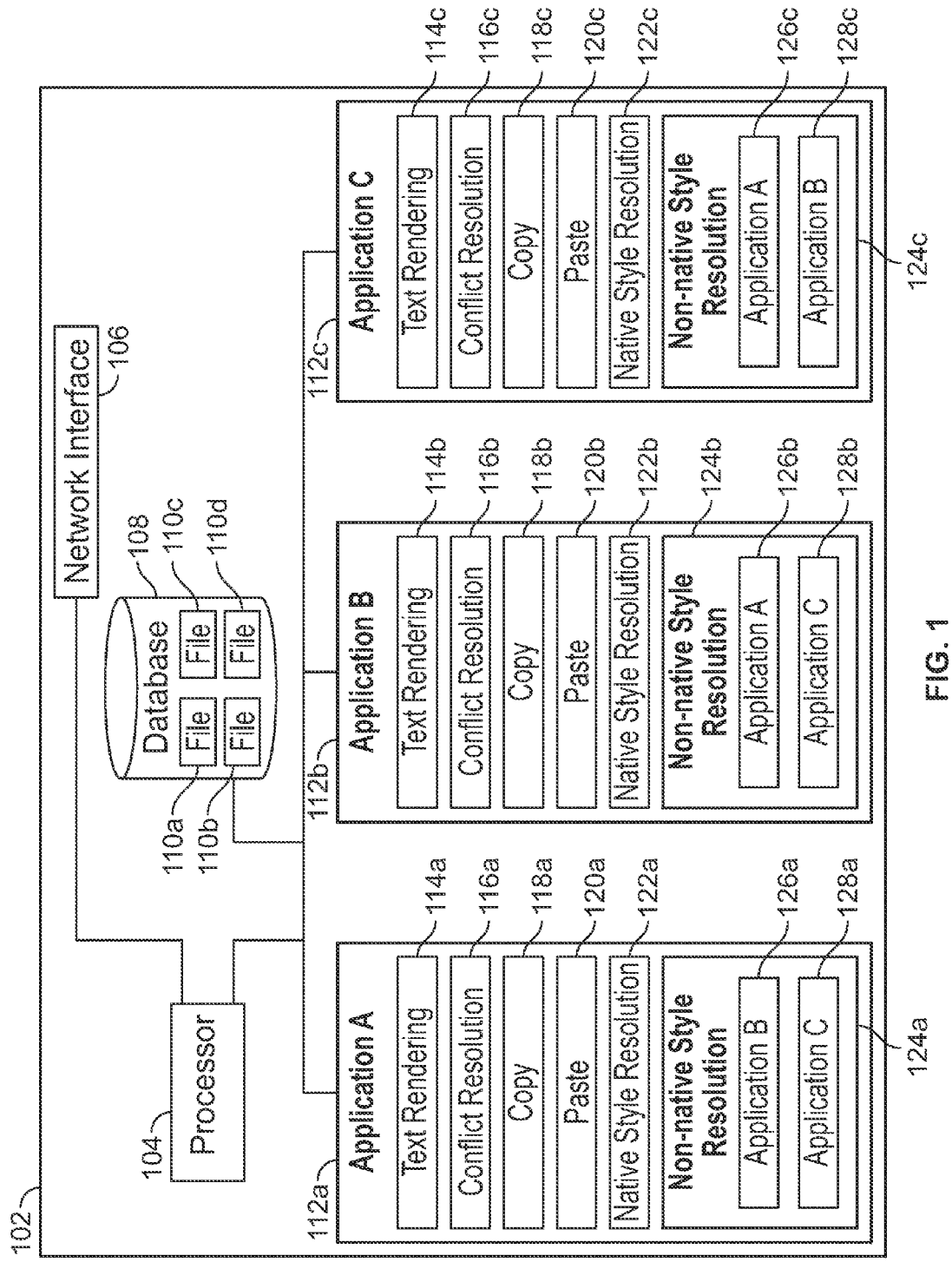
FIG. 1 is a block diagram of a user device, according to an illustrative implementation.

To provide an overall understanding of the disclosure, certain illustrative implementations will now be described, including a system for preserving conditional styles when copying and pasting between applications. In particular, a system is described in which non-native style resolution submodules of a software application are used to resolve conditional styles pasted from a document created by another software application. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more components, which include a processing device or devices, such as a computer, microprocessor, logic device or other device or processor that is configured with hardware, firmware, and software to carry out one or more of the computerized methods described herein.

As used herein, a property is a characteristic of an element of an electronic document that is associated with a value. Some examples of properties of table cells are "background color," "width," "height," "top border width," "bottom border width," "left border width," "right border width," "top margin," "bottom margin," "left margin," "right margin," "horizontal alignment," "vertical alignment," and other characteristics of table cells known in the art. As used herein, a property does not fully define the characteristic unless a value is associated with the property. A value is a quantitative metric used to define the characteristic. Examples of values are colors such as "red" and "green," numbers such as "2" and "0.856," and sets of numbers such as "[0,1]" and "[1.68, 2.52, 3.91]." Colors can be represented as numbers such as RGB triplets defining the relative proportions of red, green, and blue in the color. For example, the RGB triplet representing "red" is "[1,0,0]," and the RGB triplet representing "green" is "[0,1,0]."

Tables in electronic documents can have conditional styles, meaning that styles for cells of the table can depend on the relative location of the cells in the table. For example, a table may have a conditional style defining a banded structure, in which odd rows have a red background color and even rows have a green background color. If a row is inserted at the top of the table, the conditional style requires that the background colors of the individual cells change to preserve the banded structure of the table. Thus, the inserted first row would have a red background color, and the original first row (now the second row) would now have a green background color. In another example, a table may have a conditional style defining that a cell's property values based on the cell's position relative to another cell within the table. In this illustrative example, a table may be formatted such that if a first cell is directly above a second cell containing the text, "SUM," the first cell has a background color of red and all other cells in the table have a background color of white. If a row is inserted into the table to insert a third cell between the first and second cells, the conditional formatting would require changing the first cell's background color to "white" and the third cell's background color to "red." These examples are illustrative, and conditional formatting can specify other property values based on other relationships in a similar manner.

Elements in electronic documents can inherit styles, properties, and values from other elements. When an element inherits properties from another element, values for the inherited properties are determined by reference to the other element of the document, such as a parent or source element. In an example, a document element may have a "font" property with an associated value "Times New Roman," and the text within a table cell may inherit from the document element. Here, the table cell will not be associated with an explicit value for the "font" property. Instead, the rendering module of the application will determine that the value for the "font" property should be the value of "Times New Roman" inherited from the document element. Thus, if the document font is changed, the font of the table cell will change. A document object model (DOM) may be used to determine from which element another element should inherit. A DOM is a hierarchical structure of elements or nodes, with each element having zero or one parent elements and zero, one, or more child elements. The rendering module will determine the element from which another element should inherit by utilizing a set of rules. The rules may be embedded in the application, and may be associated with the file format of the document. In some examples, the rules can require the use of the DOM hierarchy to determine the value of an inheriting property. For example, a rendering module may start at the element in question and traverse up the hierarchy until an element with a value defined for the property in question is reached. The rendering module will then assign this value to the element in question.

As used herein, a concrete style in an electronic document explicitly associates a value with a property for one or more elements of the document. In an example of a concrete style, the background color property of a table cell will have an associated value of "red." In another example of a concrete style, the top margin property of a table cell will have an associated value of "0.1 in." As used herein, a raw style in an electronic document requires resolving to associate a value with a property for one or more elements of the document. In an example, a table can have a raw style requiring a banded structure, such that odd table rows have a background color of "red" and even table rows have a background color of "green." In this raw style, the individual table cells do not have explicitly assigned values for the "background color" property, but rather, upon rendering, the raw style is resolved to determine concrete values for each cell's "background color" property. To resolve raw styles, an application will utilize a set of rules to determine whether and how to assign concrete values to properties based on conditional styles and/or inheritance. With raw styles resolved into concrete values, the application's rendering module can render the element.

An application generally has its own associated native file format which specifies encoding of the features that the application supports. Applications will typically handle properly only those features which are supported by the application's native format. Any features which are unsupported by the application's native format will encounter problems loading or will load incorrectly. Thus, pasting an element into a destination application, if the element was created with a different source application, can cause loss of data. In particular, this occurs when the element has features that are not supported by the destination application.

A file may have a file format which determines the manner in which the file's information is encoded into bits in memory, and further, the manner in which that information is decoded from memory and presented to a user. Generally speaking, a file has a file format that is based on the application that was used to create the file, such as the application's native file format. File formats may be simple or complex. A simple file format is the American Standard Code for Information Interchange (ASCII), which encodes plain text and some simple characters. An example of a complex file is the format used to encode information in a word processing document. A word processing format may, for example, specify the encoding method for fonts, font sizes, font styles, font colors, tabs, paragraphs, bulleted lists, numbered lists, tables, text wrapping, text alignment, text highlighting, line spacing, page breaks, page size, margins, columns, headers, footers, footnotes, endnotes, cross-references, tables of contents, indices, and embedded content such as images and video. A spreadsheet format is also complex and may specify the encoding method for cell contents, formula operations, fonts, font sizes, font styles, font colors, cell borders, cell colors, and charts. A presentation format is also complex and may specify the encoding method for fonts, font sizes, font styles, font colors, text boxes, shapes, slide size, position and arrangement of items within a slide, slide ordering, slide transitions, animations, and embedded content such as images, video, and spreadsheets. Formats may specify the manner in which elements inherit from other elements. Formats may also specify the manner in which conditional formatting and raw styles are resolved into concrete values.

File formats may incorporate other formats. For example, word processing, spreadsheet, and presentation formats may all incorporate the ASCII format to encode text, but may use additional encoding methods specific to the format to encode features other than text. A file containing a document may be encoded according to a format appropriate to the document. A file may contain a word processing document, a spreadsheet document, a presentation document, a drawing document, a database document, a HyperText Markup Language (HTML) document, an Extensible Markup Language (XML) document, an image document, a text document, or any other document containing user data. When opening and editing a file, an application utilizes the file's format to decode the bits stored in memory and present the decoded information to a user.

When copying and pasting tables from a source application to a destination application, preserving the conditional styles of tables is useful. When conditional styles are preserved, the table retains structural fidelity in addition to visual fidelity. Accordingly, editing the pasted table in the destination application with preserved styles produces similar results as editing the table in the source application. However, some applications have different mechanisms for resolving table properties such as cell background color and cell border. Often, the file format for the source application supports encoding of raw styles, while the file format of the destination application does not. Additionally, there are properties related to cell styles, such as margin and vertical align, which may be inheritable in one application but not other applications. For this reason, conditional styles are not always preserved when copying between applications.

Using application submodules to preserve conditional styles is advantageous because full visual and structural fidelity of tables is maintained between applications without writing extraneous information to the clipboard. Placing both raw and concrete cell styles on the clipboard can be avoided. Furthermore, the use of application submodules obviates the need to embed a full instance of the source application in the destination application. The application submodule can include only features used to resolve styles in tables, making the submodule much smaller and higher-performance than an embedded source application.

FIG. 1 depicts a device 102 used to preserve conditional styles when copying and pasting between applications. The device 102 includes a processor 104, a network interface 106, a database 108, and applications 112a, 112b, and 112c (collectively, applications 112). The database 108 contains files 110a, 110b, 110c, and 110d (collectively, files 110). Files 110 may correspond to documents that are stored locally on the device, or they may also correspond to application code to be executed. Such application code may include instructions for implementing applications such as applications 112. Each application contains modules which execute specific features of the application. Application A 112a contains a text rendering module 114a, a conflict resolution module 116a, a copy module 118a, a paste module 120a, a native style resolution module 122a, and a non-native style resolution module 124a. The non-native style resolution module 124a contains sub-modules which are used to resolve styles from other applications. The non-native style resolution module 124a contains a sub-module for application B 126a and a sub-module for application C 128a. Application B 112b and application C 112c contain similar modules and sub-modules as application A 112a. While three applications are depicted in FIG. 1, the device 102 may contain any number of applications.

The modules and sub-modules of application A 112a operate in the following way. The text rendering module 114a will interpret data from a DOM and render it for display to a user. When the document object model is updated, the rendering module 114a can detect the updates and render the updated model for display to the user. The conflict resolution module 116a is used when the application A 112a is editing a collaborative document. Collaborative documents allow editing by multiple users who may provide conflicting edits to similar regions of the document. The conflict resolution module 116a resolves these conflicts so that the original intent of each user is preserved. The conflict resolution module 116a may use operational transforms to perform the conflict resolution. The conflict resolution module 116a is optional, and is not necessary when editing a local file, or when editing a file that is only edited by one user at a time.

A common document editing operation is copying and pasting. In this operation, content is copied from a source location to a destination location. This content can be text, tables, images, charts, or any data known in the art. The copy module 118a is invoked when the user provides a copy command. The copy module 118a determines the data to be copied, and stores a replica of the data to be copied in a temporary memory location for future use. In some examples, this temporary memory location is a clipboard of an operating system of device 102. In these examples, the data stored in this temporary location is called clipboard data. The paste module 120a is invoked when the user provides a paste command. A paste command includes a destination location. The paste module 120a inserts the clipboard data at the destination location. The copy module 118a does not erase the source data from the source location. In some examples, the application A 112a contains a cut module (not shown in FIG. 1) instead of the copy module 118a. The cut module operates in a similar manner as the copy module 118a, except that the cut module deletes the source data from the source location when the cut module is invoked. In some examples, the application A 112a contains both a cut module and a copy module 118a.

The native style resolution module 122a resolves styles associated with pasted data such that the pasted data can be rendered for display. The native style resolution module 122a contains a set of instructions that are used to determine values for properties associated with elements of the pasted data. The values may be stored as part of the element, or the values may be inherited from a parent of the element. Each of the applications 112 may use different instructions to determine how a value of a property should be inherited from another element, and so the native style resolution element 122a contains instructions that are specific to data copied and pasted within the application A 112a. Accordingly, native style resolution module 112a may not contain instructions for resolving styles of an element that is pasted from another application, such as application B 112b or application C 112c. If native style resolution module 122a were to be used to resolve the styles of an element pasted from another application, the styles of the pasted element may either be rendered incorrectly, or not rendered at all. If the styles of the element are not rendered at all, the element may be displayed as a plain text element with no formatting. These outcomes are not desirable, as data is thus lost when pasting between applications.

Accordingly, application A 112*a* also contains the non-native style resolution module 124*a*. The non-native style resolution module 124*a* contains sub-modules that are specific to other applications. In an example, the copy module 118*b* of the application B 112*b* is used to copy the data into a temporary memory location (clipboard). Then, the paste module 120*a* of the application A 112*a* is used to paste the data from temporary memory into a desired location of a document edited by the application A 112*a*. Since the source application in this example is application B 112*b*, the application B sub-module 126*a* is invoked. After pasting, the application B sub-module 126*a* retrieves instructions for resolving the styles of the pasted element. These retrieved instructions are consistent with the instructions used by the application B's native style resolution module 122*b*, such that the retrieved instructions, when executed, resolve styles of the pasted element in the same manner as the styles would have been resolved, had the pasted element been pasted into a document edited by application B 112*b*. The application B sub-module 126*a* executes the retrieved instructions to resolve the styles of the pasted element. This execution produces concrete values for each style so that it can be rendered by the rendering module 114*a*. The application C sub-module 128*a* can likewise resolve raw styles contained in data that is pasted from the application C 112*c*. While the depiction of non-native style resolution module 124*a* contains two sub-modules, the module 124*a* may contain any number of sub-modules. By using a sub-module specific to the source application, conditional formatting and inheritance behavior can be preserved when copying and pasting between applications with different conditional formatting and inheritance behavior. One benefit of using application specific sub-modules to resolve styles of pasted elements is that when a pasted element is later modified, the element retains its overall style.

FIGS. 2-7 depict a table with banded rows pasted into a destination application, and the use of a non-native style resolution submodule to resolve the raw styles into concrete values. While the style of row banding to determine background color is depicted as illustrative, the non-native style resolution submodule can resolve any raw style associated with a table. For example, the submodule can resolve other properties of tables and table cells such as "background color," "width," "height," "top border width," "bottom border width," "left border width," "right border width," "top margin," "bottom margin," "left margin," "right margin," "horizontal alignment," "vertical alignment," and other properties of tables and table cells known in the art. Furthermore, while insertion of a row is depicted, the methods and systems described herein can use non-native style resolution submodules to resolve properties after any operation that modifies the number of cells in a table, such as insertion of columns, deletion of rows, or deletion of columns.

Figure 2:
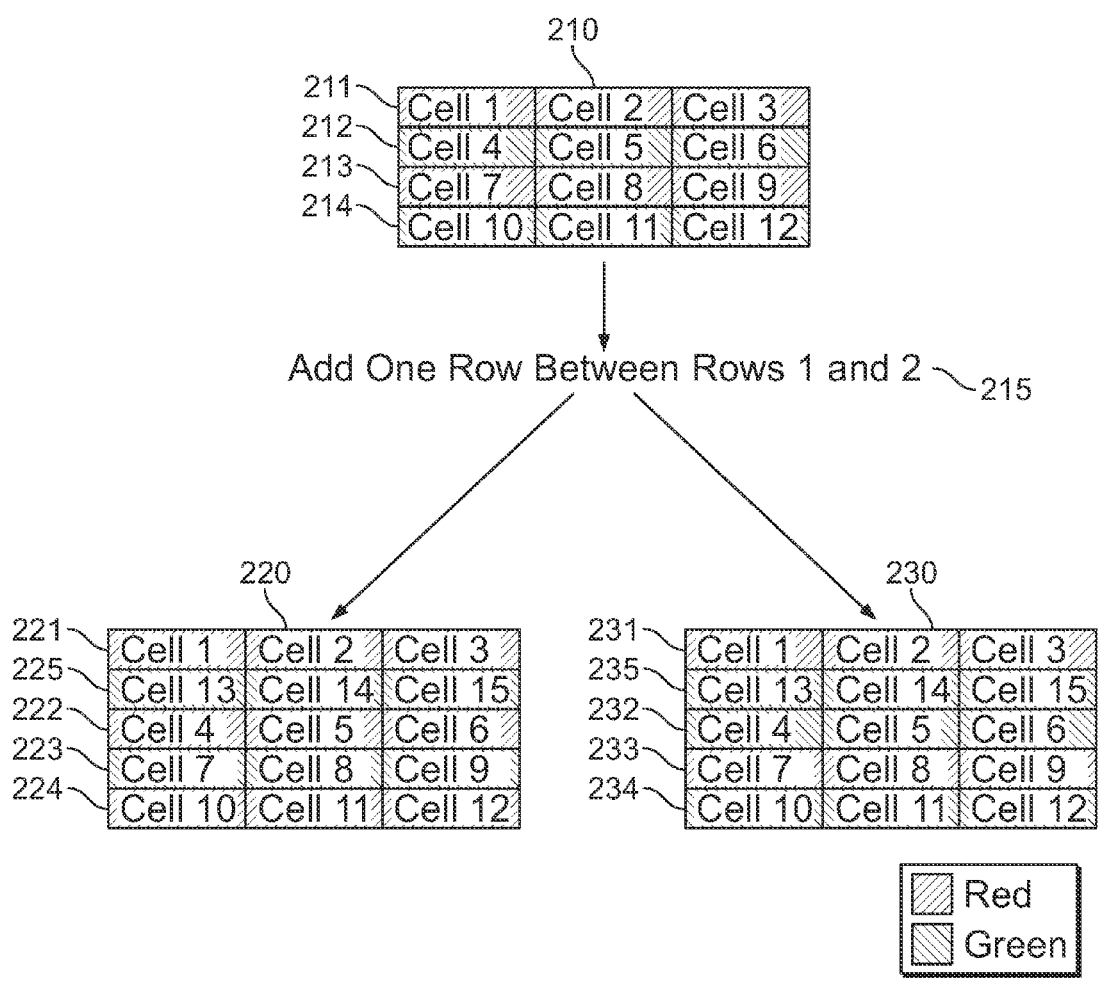
FIG. 2 depicts the insertion of a row into a pasted table, according to an illustrative implementation.

FIG. 2 depicts the insertion of row into a pasted table, and two possible resulting outcomes for the resolution of the table's styles. The table 210 has been pasted into a destination application from a source application. The table 210 contains cells arranged in a rectangular grid of rows and columns. In particular, the table 210 contains four rows 211-214. In the source application, the table 210 was conditionally formatted with row banding. This conditional formatting specifies that odd rows are red and even rows are green, such that rows 211 and 213 are red and rows 212 and 214 are green. Accordingly, the property "background color" is associated with cells in the rows 211-214. Proper implementation of this conditional formatting will preserve the banding feature and accommodate modifications to the table, such as insertion of a row 215 between the first and second rows of the table.

Table 220 depicts a row insertion into a pasted table with the raw style for banding preserved. Thus, when the row 225 is inserted between rows 221 and 222, the background color for each cell is determined depending on the cell's position within the table, changing the background colors of rows 222-224 to different colors than before. Thus, the banding structure of the table 220 is preserved.

Table 230 depicts a row insertion into a pasted table without raw styles preserved. Table 230 only contains a concrete style specifying the explicit background color for cells in each row. Thus, when row 235 is inserted between rows 231 and 232, each of rows 231-234 retained its original color, and row 235 was given the color of the row below it, row 232. The background colors of cells were not determined based on position in the table, but rather based on concrete values associated with each cell or row. Since a raw style was not applied to this table, but rather concrete styles for each cell were used, the banding structure of the original table 210 was not preserved. If a destination application does not contain instructions for resolving raw styles, the styles of a pasted element may be resolved as concrete styles as shown in table 230, resulting in loss of the original structure of the element. However, by using raw styles to resolve some properties, the structure of the original table 210 can be preserved.

Figure 3:
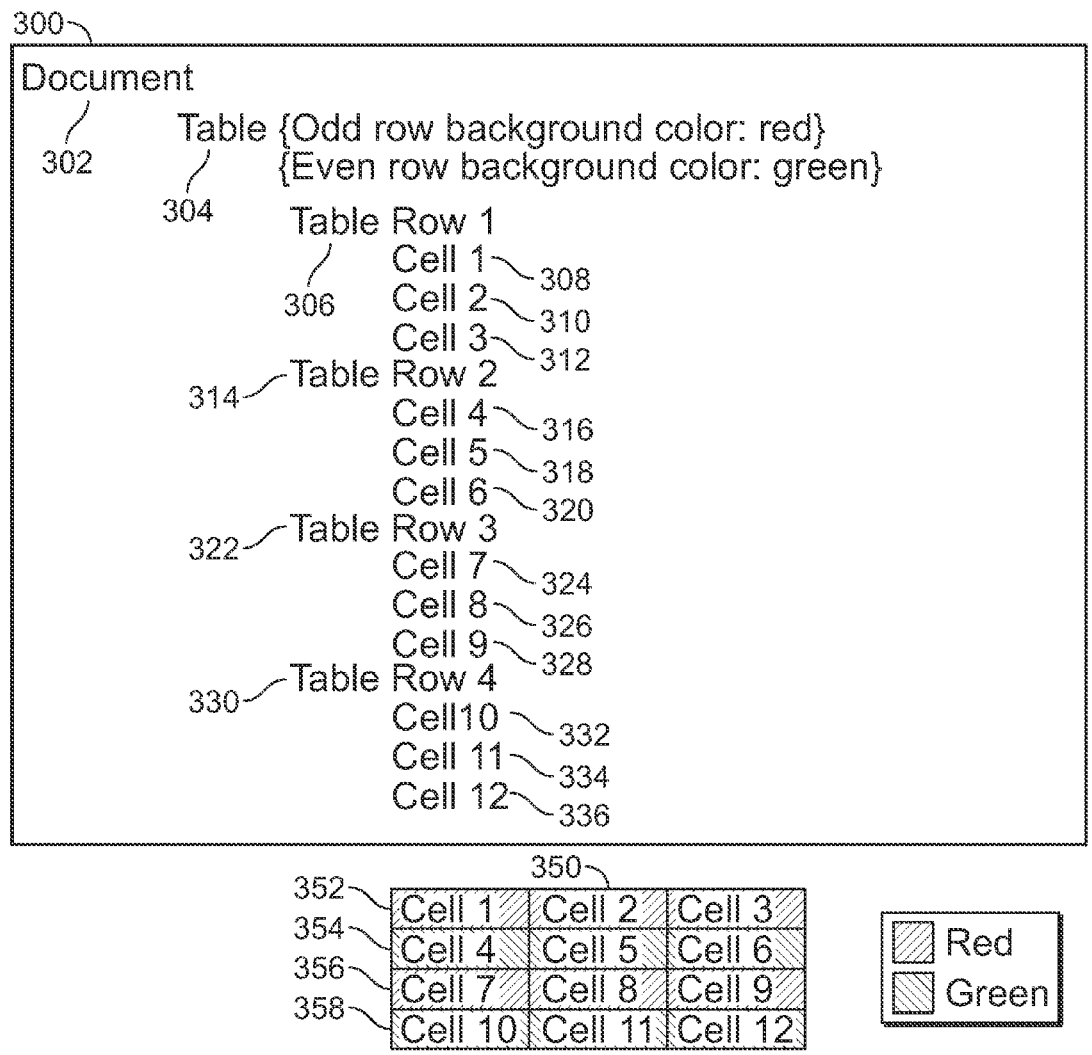
FIG. 3 depicts a document object model (DOM) of a table with raw styles, and a rendering of the DOM, according to an illustrative implementation.

FIG. 3 depicts a DOM 300 of a table with raw styles, and a rendering 350 of DOM 300. The DOM 300 and rendering 350 are part of a document edited in an application that supports raw styles for cell background color. The DOM 300 contains a hierarchical structure of elements, such that each element has zero or one parent elements and zero, one, or more child elements. The document element 302 has no parent elements, and is at the top of the DOM hierarchy. The document element 302 has one child element: table element 304. While not shown in FIG. 3, the document element 302 may have other child elements, such as paragraph elements, heading elements, title elements, and list elements. The table element 304 has four child elements: row elements 306, 314, 322, and 330. Each of the row elements has three child elements, corresponding to each of the cells in the respective row. For example, row element 306 has three child elements: cell elements 308, 310, and 312. Row element 314 has three child elements: cell elements 316, 318, and 320. Row element 322 has three child elements: cell elements 324, 326, and 328. Row element 330 has three child elements: cell elements 332, 334, and 336. The table element 304 has a raw style defined by two properties. These properties are the background color of odd rows, and the background color of even rows. Each property has an associated value. The odd row background color value is red, and the even row background color value is green. The raw style defined by these two properties is inherited by all child elements of the table element 304. Thus, since row 306 is an odd row, its child elements 308, 310, and 312 inherit its background color of red. Since row 314 is an even row, its child elements, cells 316, 318, and 320, inherit its background color of green. The cells in the rows 322 and 330 inherit background colors in a similar manner. Since FIG. 3 depicts a document edited in an application that supports raw styles for cell background color, a native style resolution module such as the module 122*a* is used. The native style resolution module determines the concrete value for background color that each cell should inherit from the raw style of the table 304 and provides the concrete values to a rendering module such as the module 114*a*. The rendering 350 illustrates the result of the application of these raw styles of the DOM 300. The odd rows 352 and 356 have a background color of red, and the even rows 354 and 358 have a background color of green.

Figure 4:
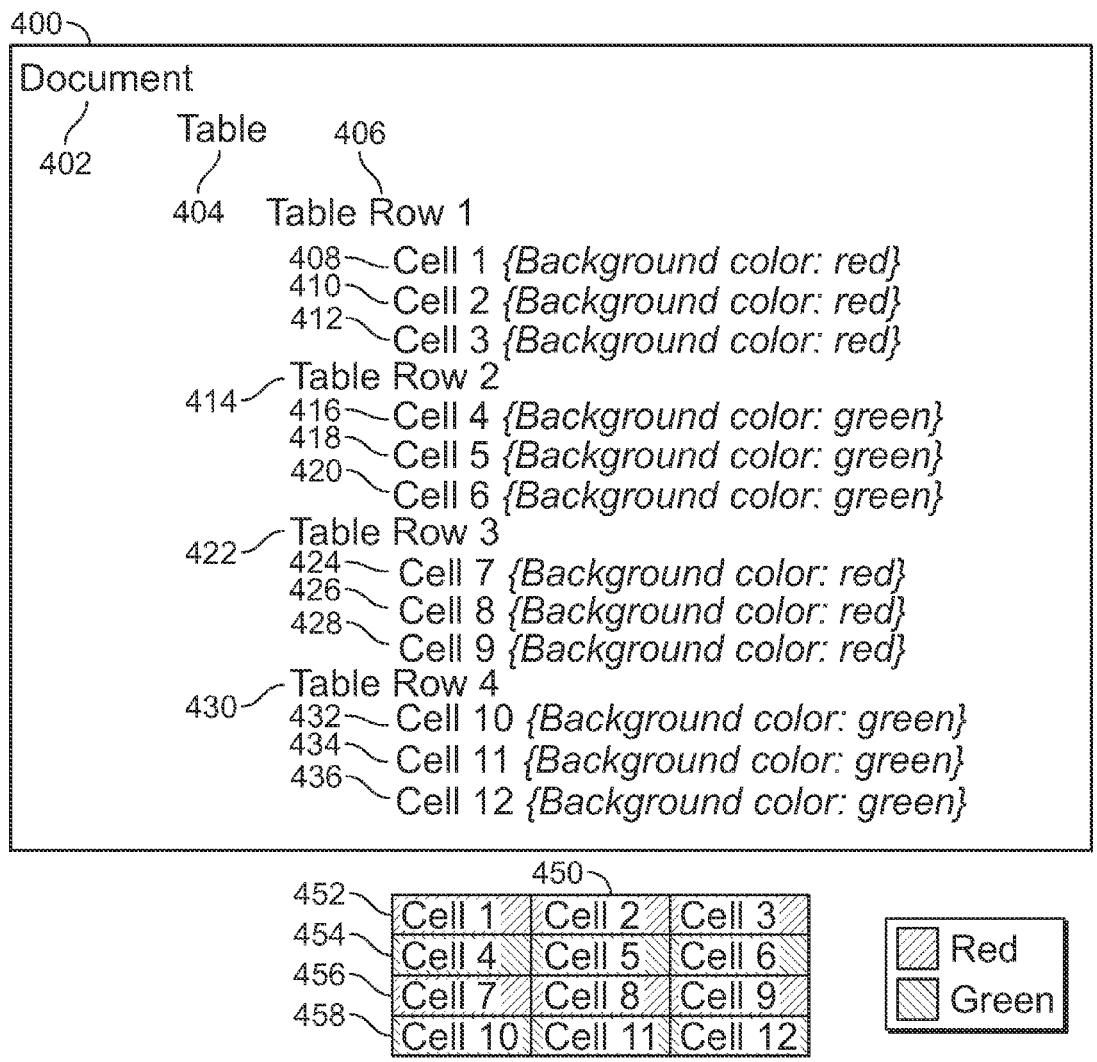
FIG. 4 depicts a DOM of a table with concrete styles, and a rendering of the DOM, according to an illustrative implementation.

FIG. 4 depicts a DOM 400 of a table with concrete styles, and a rendering 450 of the DOM 400. The DOM 400 and rendering 450 are part of a document edited in an application that does not support raw styles for cell background color. The DOM 400 contains elements and parent-child relationships that are similar to those of the DOM 300. The document element 402 has one child element: the table element 404. The table element 404 has four child elements: row elements 406, 414, 422, and 430. Row element 406 has three child elements: cell elements 408, 410, and 412. Row element 414 has three child elements: cell elements 416, 418, and 420. Row element 422 has three child elements: cell elements 424, 426, and 428. Row element 430 has three child elements: cell elements 432, 434, and 436. In contrast to the DOM 300, the DOM 400 does not have raw styles determining background color. Instead, each cell in the table has an explicitly specified concrete value for its background color property. A native style resolution module such as the module 122*a* provides the concrete values to a rendering module such as the module 114*a*. The table 450 depicts a rendering of the DOM 400 based on these concrete values. The rows 452 and 456 have background colors of red, as specified by the concrete values for each cell in each of the rows. The rows 454 and 458, likewise, have background colors of green, as specified by the cells' concrete values.

Figure 5:
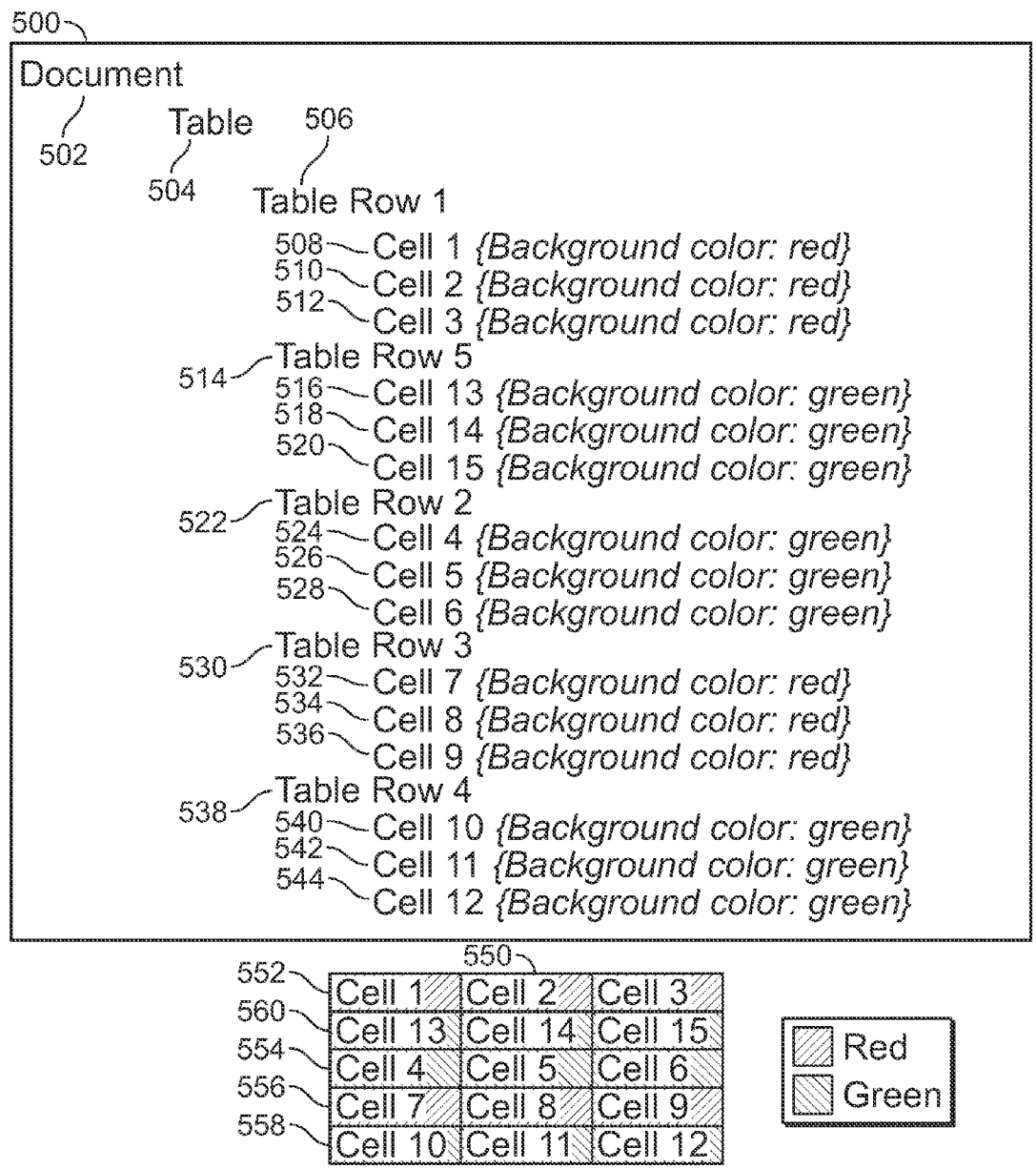
FIG. 5 depicts a DOM of a table with concrete styles and an inserted row, and a rendering of the DOM, according to an illustrative implementation.

FIG. 5 depicts a DOM 500 containing a table with concrete styles, and a rendering 550 of the DOM 500. The DOM 500 and rendering 550 are part of a document edited in an application that does not support raw styles for cell background color. The DOM 500 contains elements and parent-child relationships that are similar to those of the DOM's 300 and 400. In the DOM 500, a row has been inserted into the table. The DOM 500 contains a document element 502, which has table element 504 as a child element. The table element 504 has five row elements, row elements 506, 522, 530, and 538, and the inserted row 514. The row element 506 has three child elements: cell elements 508, 510, and 512. The row element 514 has three child elements: cell elements 516, 518, and 520. The row element 522 has three child elements: the cell elements 524, 526, and 528. The row element 530 has three child elements: cell elements 532, 534, and 536. The row element 538 has three child elements: cell elements 540, 542, and 544. Like the DOM 400, the DOM 500 contains concrete values, not raw styles, for cell background color. Since each of the cell elements has a concrete value explicitly defining the background color, the background color of each cell is not inherited from a parent element or referenced to a raw style. Accordingly, even after the addition of table row 514, each cell element retained its original value for background color. A native style resolution module such as the module 122*a* provides the concrete values to a rendering module such as the module 114*a*. The rendering 550 depicts the modified table. The rendering 550 contains five rows: rows 552, 560, 554, 556, and 558. The row 560 was inserted between the original rows 552 and 554. When the row 560 was inserted, the banding of the table was not preserved. Instead, each cell kept its original color, and the row 560 received a background color of green, corresponding to the background color of the row below, row 554. Since only concrete styles are used, the banded structure of the table was not preserved upon the insertion of a row.

Figure 6:
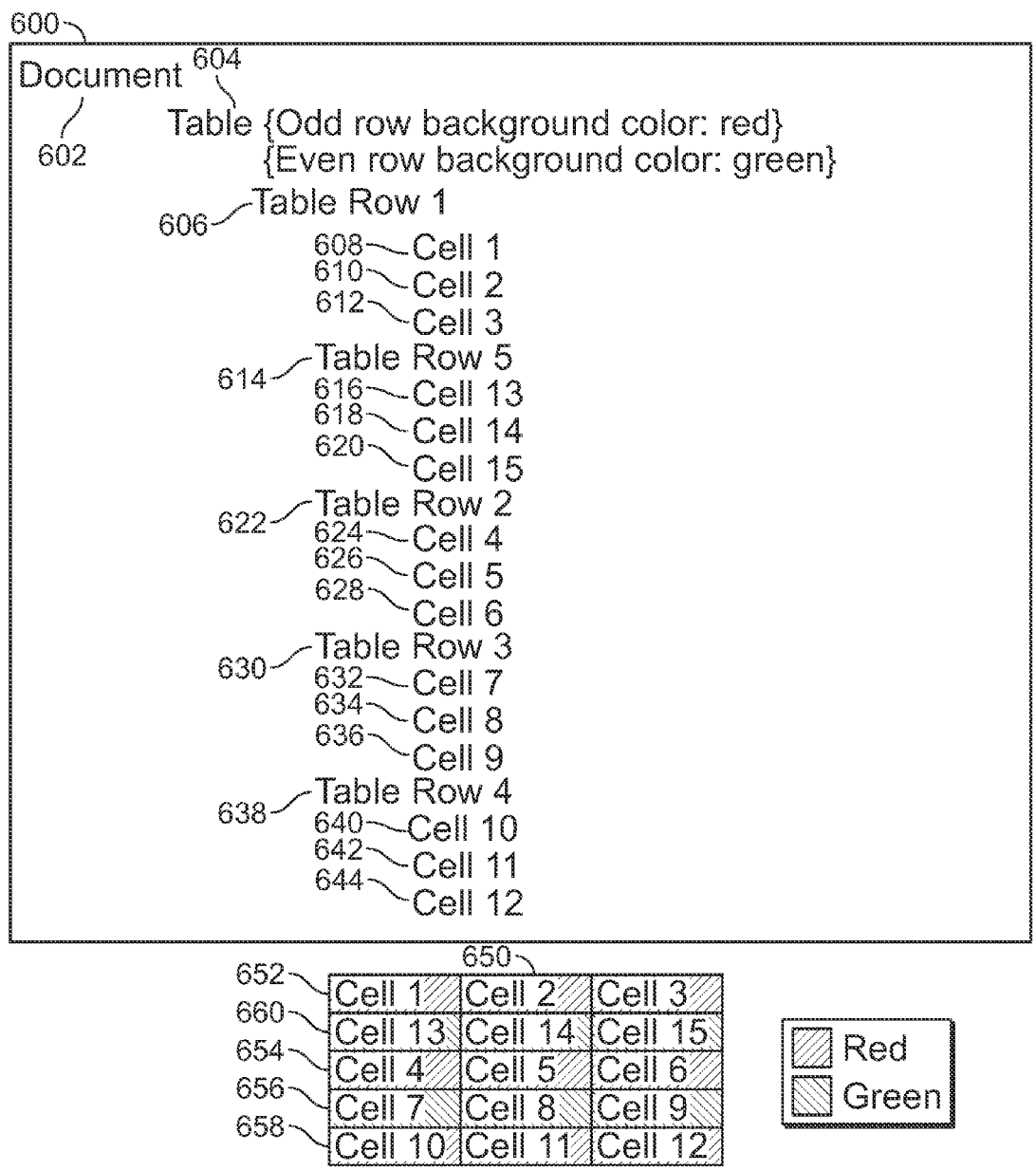
FIG. 6 depicts a DOM of a table with raw styles and an inserted row, and a rendering of the DOM, according to an illustrative implementation.

FIG. 6 depicts a DOM 600 of a document containing a table, and a rendering 650 of the table. The DOM 600 and rendering 650 are part of a document edited in an application that supports raw styles for cell background color. The DOM 600 contains elements and parent-child relationships that are similar to those of the DOM's 300, 400, and 500. The DOM 600 contains a document element 602 which has a child table element 604. The table element 604 has five child elements: row elements 606, 614, 622, 630, and 638. Each row element has child elements. The row element 606 has three child elements: cell elements 608, 610, and 612. The row element 614 has three child elements: cell elements 616, 618, and 620. The row element 622 has three child elements: cell elements 624, 626 and 628. The row element 630 has three child elements: cell elements 632, 634, and 636. The row element 638 has three child elements: cell elements 640, 642, and 644. Like the DOM 300, the DOM 600 contains raw styles, not concrete values, for cell background color. The table element 604 has a raw style containing two properties: an odd row background color property and an even row background color property. The values for the odd and even row background color properties are red and green, respectively. This raw style provides instructions for assigning background colors to each cell element in the table. Cells in odd rows will have a background color of red, and cells in even rows will have a background color of green. The cells in the table 604 do not have concrete styles assigned. Instead, a native style resolution module such as the module 122*a* determines that the cells inherit a concrete value for background color from the raw style of the table 604 and provides the concrete values to a rendering module such as the module 114*a*. The rendering 650 depicts the DOM 600 after application of the raw styles of the table 604. The table rendered in 650 has five rows: rows 652, 660, 654, 656, and 658. Row 660 has been inserted between the original rows 652 and 654. Since the table 604 has a raw style defining the background color of each cell in the table, insertion of the row 660 did not change the banding of the table. Instead, odd rows retained a background color of red, and even rows retained a background color of green. Since raw styles are used, the banded structure of the table are preserved upon insertion of a row.

Figure 7:
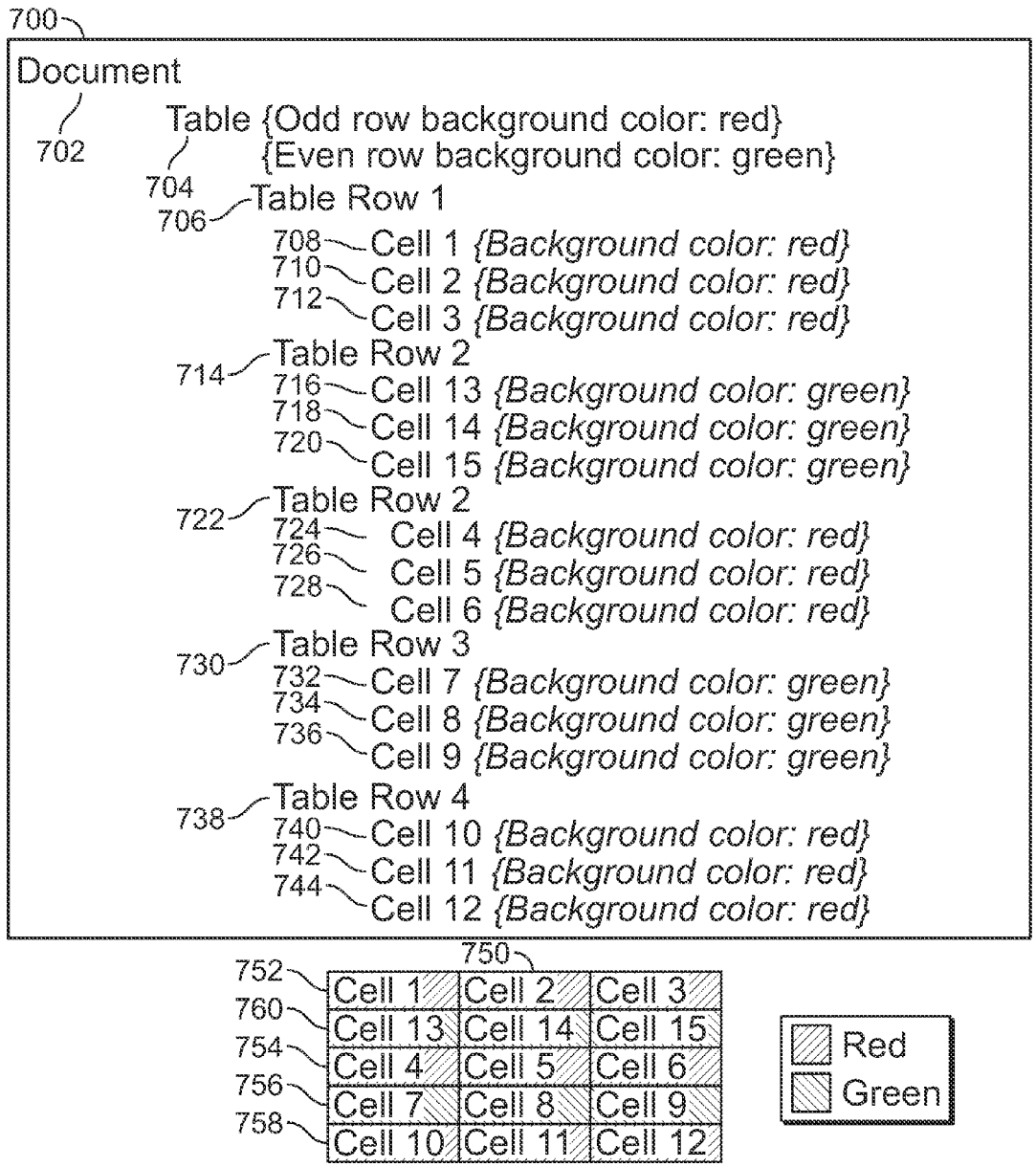
FIG. 7 depicts a DOM of a table with raw styles that have been resolved to concrete styles and an inserted row, and a rendering of the DOM, according to an illustrative implementation.

FIG. 7 depicts a DOM 700 with a banded table and a rendering 750 of the table. The DOM 700 and rendering 750 are copied from a source application supporting raw styles for background color and pasted into a destination application not supporting raw styles for background color. Accordingly, without a non-native style resolution submodule, the rendering of the table after insertion of a row would be similar to the rendering 550. However, a non-native style resolution submodule is used to result in the rendering 750. The DOM 700 contains elements and parent-child relationships that are similar to those of the DOM's 300, 400, 500, and 600. The DOM 700 contains a document element 702, which has a child table element 704. The table element 704 has five child elements: row elements 706, 714, 722, 730, and 738. The row element 706 has three child elements: cell elements 708, 710, and 712. The row element 714 has three child elements: cell elements 716, 718, and 720. The row element 722 has three child elements: cell elements 724, 726, and 728. The row element 730 has three child elements: cell elements 732, 734, and 736. The row element 738 has three child elements: cell elements 740, 742, and 744. The DOM 700 depicts a table with raw styles, and the concrete values that are resolved from the raw styles. The table element 704 has a raw style for background color that is similar to the raw style of the table element 604. Upon rendering, each of the cells has been explicitly assigned a concrete value for the background color property. These concrete values are assigned based on the raw style of the element 704. Resolving the concrete values from raw styles is performed by a non-native style resolution submodule such as the submodule 126a. The rendering 750 displays a table with five rows: rows 752, 754, 756, 758, and the row 760, which was inserted between the original rows 752 and 754. After insertion of the row 760, the raw styles were resolved into concrete styles for each cell by the appropriate submodule. These resolved concrete styles were then rendered to produce the table 750. These steps of resolution and rendering are repeated at specified intervals, or after modification of the document by a user. The concrete styles in DOM 700 can thus be rendered even by applications not capable of resolving raw styles. By using the appropriate non-native style resolution sub-module to resolve raw styles into concrete styles, the banded structure of the table 750 is preserved upon insertion of a row. While FIGS. 2-7 depict the insertion of a row into a pasted table, the methods and systems described herein can be used to preserve conditional formatting when rows are deleted from tables, when columns are inserted into or deleted from tables, or any other operation that changes the number of cells in a table.

Figure 8:
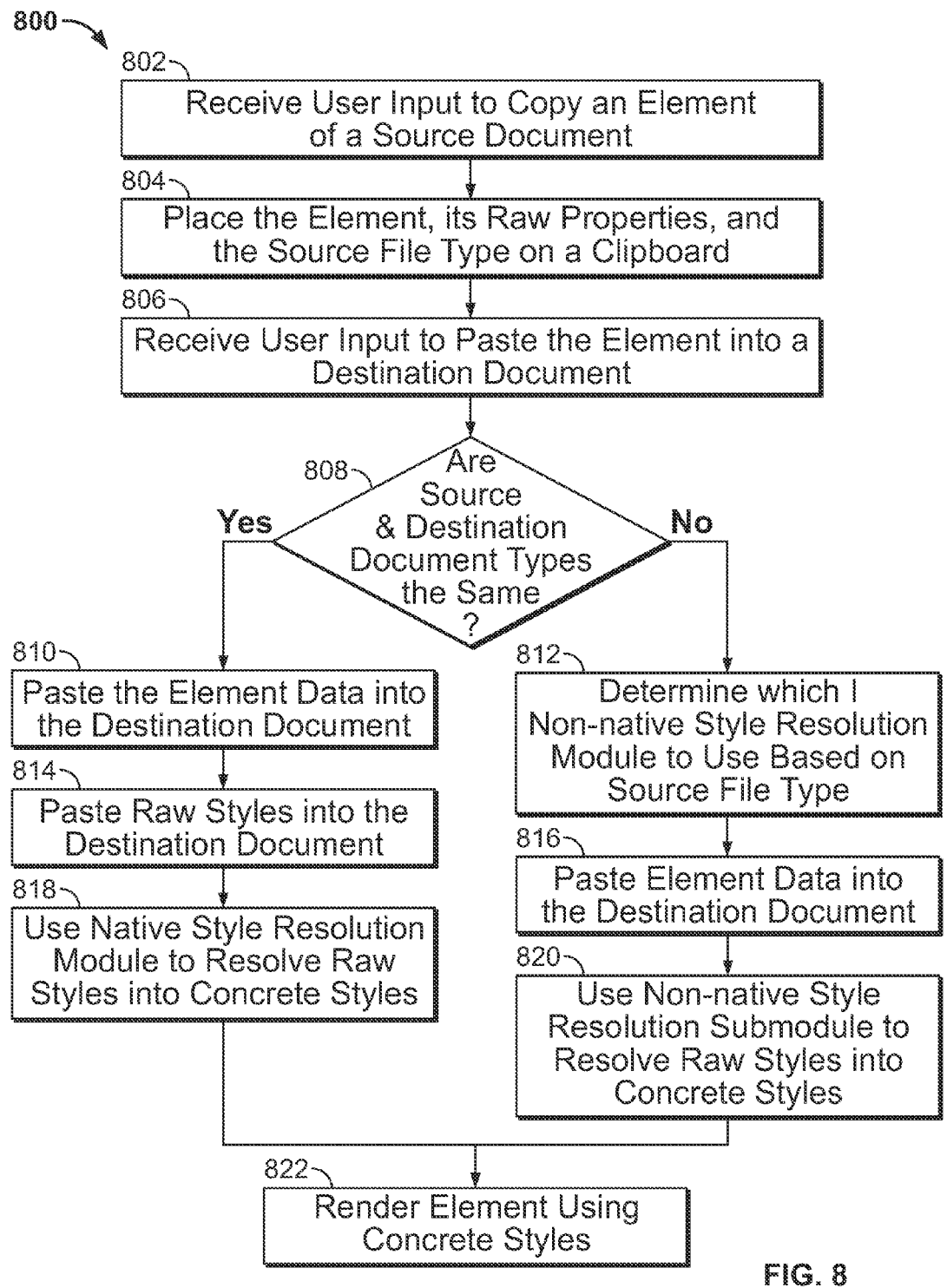
FIG. 8 depicts a flow chart of a method by which source and destination applications copy and paste an element containing raw styles, according to an illustrative implementation.

FIG. 8 is a flowchart of a method 800 used to resolve raw styles into concrete styles for rendering. The method 800 may be used by a destination application running on a user device that does not support resolving raw styles, but has a sub-module to resolved raw styles pasted from a source application also running on the user device. Also, the method 800 may be used by a destination application that resolves raw styles, but in a manner different from that used by the source application. At step 802, a user input is received by a source application to copy an element of a source document. The copied element may be any element of a DOM, such as a paragraph element, a list element, a table element, a row element, a cell element, and the like. At step 804, the element, its raw properties, and the file type of the source document are placed on the clipboard. The clipboard may be a temporary memory location on the user device running the source application used to store elements for copying. The file type may be any type that identifies the file type, such as a Multipurpose Internet Mail Extensions (MIME) type, a file extension, or an identifier associated with an application.

An source application may determine the file type using one of several methods. In an example, the source application may determine the file type based on the filename extension of the file. In another example, the source application may use header information of the file to determine the format. In this example, the source application may read a portion of the header information of the file. The source application may then interpret the read portion of the header of the file to determine the format of the file. The source application may perform the determination based on a string indicating file type contained in the header. An example of a file type is a Multipurpose Internet Mail Extensions (MIME) type.

At step 806, a user input is received by the destination application to paste the copied element into a destination document. At step 808, the processor determines whether the source and destination types are the same. The processor may make this determination by comparing the file type stored on the clipboard and the destination file type. If the source and destination document types are the same, the method proceeds to step 810. At step 810, the destination application pastes the data associated with the element into the destination document. At step 814, the raw styles associated with the elements are pasted into the destination document. At step 818, the native inheritance resolution module of the destination application resolves the raw styles into concrete styles.

If the source and destination document types are not the same, the method proceeds from step 808 to step 812. At step 812, the destination application determines which resolution sub-module to use for resolving the pasted raw styles. The destination application may make this determination based on the file type associated with the clipboard data. At step 816, the destination application pastes the clipboard data associated with the copied element into the destination document at the destination location. At step 820, the selected resolution sub-module of the destination application resolves the raw styles into concrete styles according to the style resolution instructions of the source application. At step 822, the destination application renders the pasted element using the resolved concrete styles.

Figure 9:
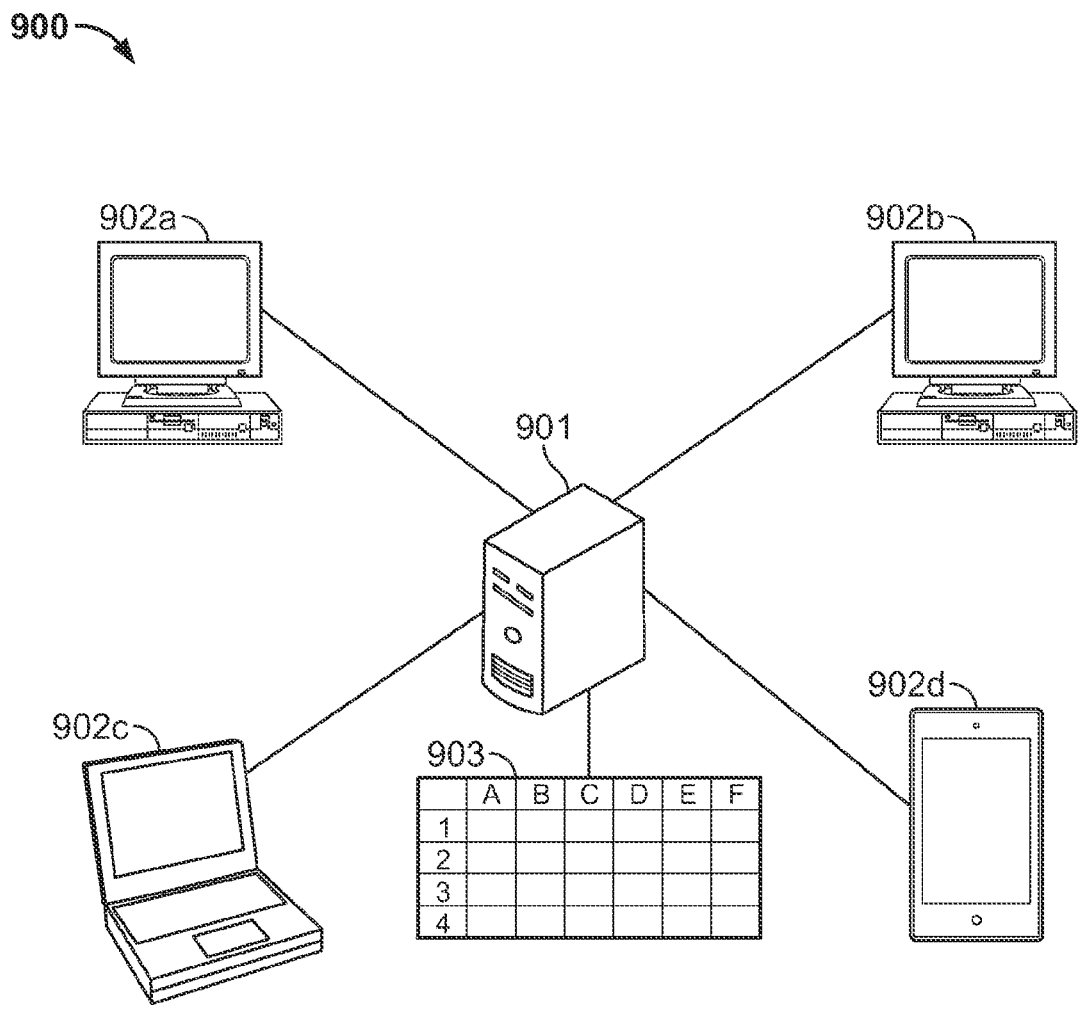
FIG. 9 is a block diagram of a cloud computing service, according to an illustrative implementation.

FIG. 9 shows a client-server system 900 that includes a cloud computing service 902 and a number of client devices 904a-904d (generally, client device 904). The cloud computing service 902 provides cloud computing services for a set of client devices 904. In particular, the cloud computing service 902 may include one or more servers that store a number of files accessible by the client devices 904a-904d, such as an exemplary collaborative spreadsheet 906. While the document 906 is depicted as a spreadsheet, the document 906 can be a word processing document, a presentation document, a drawing document, a webpage document, or other electronic document. Users at the client devices 904 may create, edit, copy, share, and delete files stored on the cloud computing service 902. For example, the client devices 904 may each use a web browser to simultaneously access the spreadsheet 906 on the cloud computing service 902. The cloud computing service 902 provides each client device 904 with a local copy of the spreadsheet 906, which users on the client devices 904 may then view and edit. The cloud computing service 902 may synchronize the local copies of the spreadsheet 906 with one another and with a copy of the spreadsheet 906 that is stored on a server in the cloud computing service 902. In one example, edits, which may be referred to herein as changes, that are made by the client device 904a are automatically sent to the cloud computing service 902 and transmitted to the other client devices 904b, 904c, and 904d. In this manner, changes made by one collaborator may be immediately seen by other collaborators.

As used herein, a file includes a set of digitally encoded bits stored on a storage medium. A cloud file includes a file that is stored on a server and accessible via a network. A local file includes a file stored on a user's local device. A client device includes a local device that communicates with a server in a client-server relationship. As used herein, a client device is synonymous with a user device and a local device, unless indicated otherwise by context. As used herein, a document can be associated with multiple files. For example, a cloud file may be a copy of a document stored on a server, and a local file may be a copy of the same document stored on a local device. Generally, multiple copies of the same document may be identical, but they may differ if changes made by one collaborator have not yet been transmitted to other collaborators. This situation may occur when the network connection is slow or intermittent. Multiple copies of the same document may also differ slightly if the copies are stored on disparate types of devices, such as devices with different operating systems. In this case, different copies may have slightly different metadata, or may be encoded differently. For example, one copy may be encoded in a big-endian format, and another copy may be encoded in a little-endian format. These format differences can exist across multiple files that are copies of the same document, as long as the substance of the information that is displayed to the user is the same across the copies. A local device may read the contents of a file (stored in non-volatile memory) and store a model representing the file in working memory. The working memory may be volatile (e.g. RAM or an equivalent).

The client devices 904 may include any combination of desktop computers, laptop computers, tablets, smart phones, mobile electronic devices, or any other device that may connect to the cloud computing service 902 through a network. Only four client devices 904 are shown in system 900, but it should be understood that any number of client devices 904 of any type may be configured to communicate with the cloud computing service 902. The cloud computing service 902 and the client devices 904 of the system 900 may be connected through a remote network, such as the Internet. The network connection may be facilitated through a local area network, wide area network, Ethernet, fiber optic network, wireless network, cellular network, interactive television network, telephone network, wireless data transmission system, two-way cable system, customized private or public computer network, interactive kiosk network, direct link, satellite network, and or any other wired or wireless connection.

Figure 10:
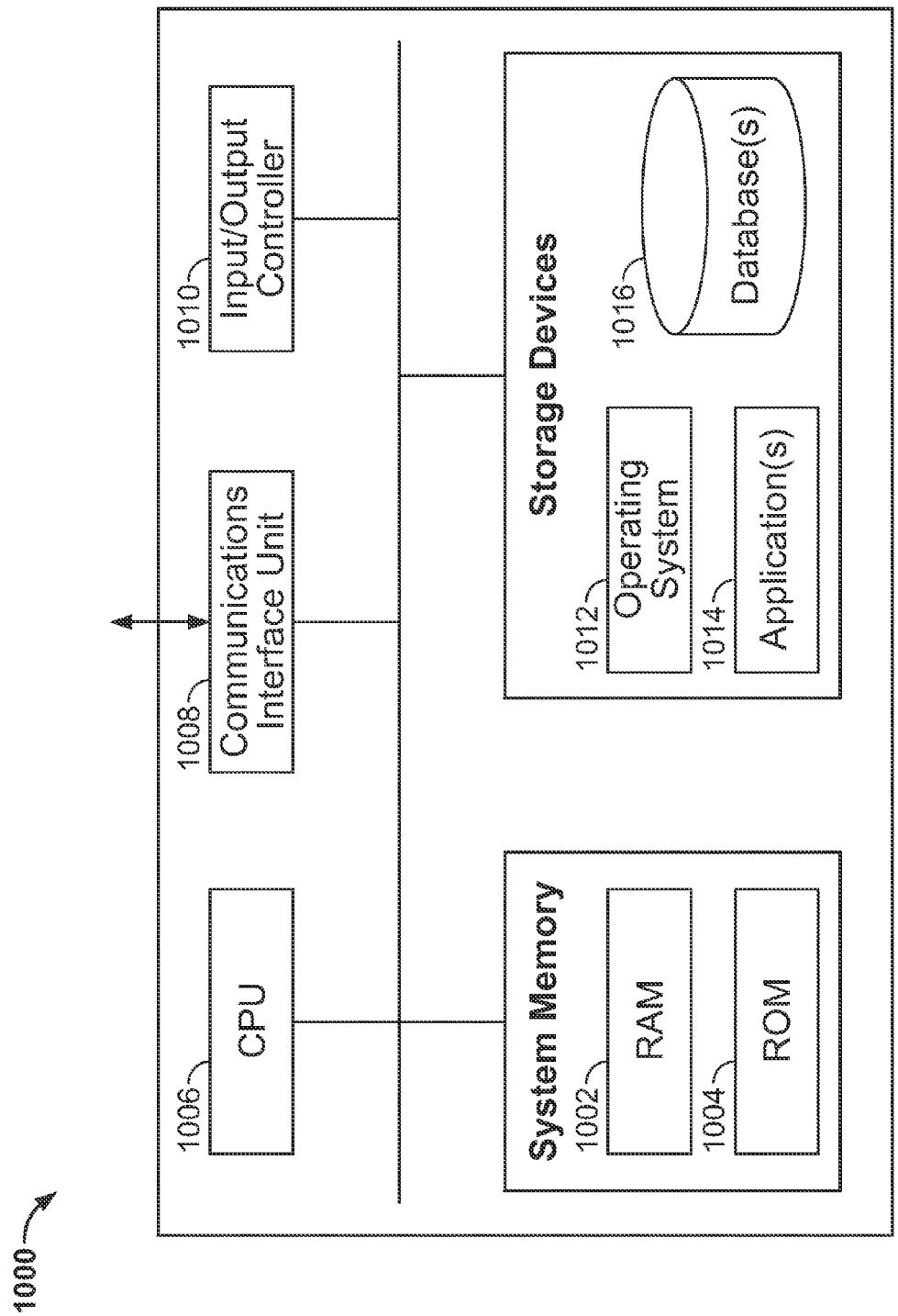
FIG. 10 is a block diagram of a computing device for performing any of the processes described herein, according to an illustrative implementation.

FIG. 10 is a block diagram of a computing device, such as any of the components of the systems of FIGS. 1-9, for performing any of the processes described herein. Each of the components of these systems may be implemented on one or more computing devices 1000. In certain aspects, a plurality of the components of these systems may be included within one computing device 1000. In certain implementations, a component and a storage device may be implemented across several computing devices 1000.

The computing device 1000 includes at least one communications interface unit, an input/output controller 1010, system memory, and one or more data storage devices. The system memory includes at least one random access memory (RAM 1002) and at least one read-only memory (ROM 1004). All of these elements are in communication with a central processing unit (CPU 1006) to facilitate the operation of the computing device 1000. The computing device 1000 may be configured in many different ways. For example, the computing device 1000 may be a conventional standalone computer or alternatively, the functions of computing device 1000 may be distributed across multiple computer systems and architectures. Alternatively, a computer system may be virtualized to provide the functions of multiple computing devices 1000. In FIG. 10, the computing device 1000 is linked, via network or local network, to other servers or systems.

The computing device 1000 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1008 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1006 includes a processor, such as one or more conventional microprocessors and one or more supplementary co-processors such as math co-processors for offloading workload from the CPU 1006. The CPU 1006 is in communication with the communications interface unit 1008 and the input/output controller 1010, through which the CPU 1006 communicates with other devices such as other servers, user terminals, or devices. The communications interface unit 1008 and the input/output controller 1010 may include multiple communication channels for simultaneous communication with, for example, other processors, servers or client terminals.

The CPU 1006 is also in communication with the data storage device. The data storage device may include an appropriate combination of magnetic, optical or semiconductor memory, and may include, for example, RAM 1002, ROM 1004, flash drive, an optical disc such as a compact disc or a hard disk or drive. The CPU 1006 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1006 may be connected to the data storage device via the communications interface unit 1008. The CPU 1006 may be configured to perform one or more particular processing functions.

The data storage device may store, for example, (i) an operating system 1012 for the computing device 1000; (ii) one or more applications 1014 (e.g., computer program code or a computer program product) adapted to direct the CPU 1006 in accordance with the systems and methods described here, and particularly in accordance with the processes described in detail with regard to the CPU 1006; or (iii) database(s) 1016 adapted to store information that may be utilized to store information required by the program.

The operating system 1012 and applications 1014 may be stored, for example, in a compressed, an uncompiled and an encrypted format, and may include computer program code. The instructions of the program may be read into a main memory of the processor from a computer-readable medium other than the data storage device, such as from the ROM 1004 or from the RAM 1002. While execution of sequences of instructions in the program causes the CPU 1006 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 1012, a database management system and "device drivers" that allow the processor to interface with computer peripheral devices (e.g., a video display, a keyboard, a computer mouse, etc.) via the input/output controller 1010.

The term "computer-readable medium" as used herein refers to any non-transitory medium that provides or participates in providing instructions to the processor of the computing device 1000 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1006 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1000 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method comprising:
   receiving, by at least one processor executing a source application, a user input to copy a first source child element of a source electronic document that is edited by the source application, wherein a source file type of the source electronic document supports a first raw property for the first source child element, wherein the first raw property has a conditional or an inheritance behavior that is based on a first source parent element of the source electronic document, and wherein the conditional or the inheritance behavior of the first raw property is used to determine a first concrete property of the first source child element for rendering the source electronic document on a display;

in response to receiving the user input to copy the first source child element, placing, by the processor executing the source application, first clipboard data on a clipboard without placing the first concrete property of the first source child element on the clipboard, wherein the first clipboard data comprises the first raw property and the source file type;

receiving, by the processor executing a destination application, a user input to paste the first source child element as a first destination child element into a destination electronic document that is edited by the destination application;

determining, by the processor executing the destination application, that a destination file type of the destination electronic document supports the first raw property for the first destination child element, wherein the first raw property has a conditional or an inheritance behavior that is based on a first destination parent element of the destination electronic document, wherein the conditional or the inheritance behavior of the first raw property is used to determine a first concrete property of the first destination child element for rendering the destination electronic document on the display, and wherein the destination file type is different from the source file type;

pasting, by the processor executing the destination application, the first clipboard data into the destination electronic document for the first destination child element, wherein the pasted first clipboard data preserves the conditional or the inheritance behavior of the first raw property for the first destination child element;

executing, by the processor executing the destination application without embedding a full version of the source application in the destination application, instructions of the first raw property from the pasted first clipboard data to determine the first concrete property of the first destination child element;

rendering, based on the determined first concrete property of the first destination child element, the destination electronic document on the display;

receiving, by the processor executing the source application, a user input to copy a second source child element of the source electronic document, wherein the source file type of the source electronic document supports a second raw property for the second source child element, wherein the second raw property has a conditional or an inheritance behavior that is based on a second source parent element of the source electronic document, and wherein the conditional or the inheritance behavior of the second raw property is used to determine a second concrete property of the second source child element for rendering the source electronic document on the display;

in response to receiving the user input to copy the second source child element, placing, by the processor executing the source application, second clipboard data on the clipboard without placing the second concrete property of the second source child element on the clipboard, wherein the second clipboard data comprises the second raw property and the source file type;

receiving, by the processor executing the destination application, a user input to paste the second source child element as a second destination child element into the destination electronic document;

determining, by the processor executing the destination application, that the destination file type of the destination electronic document does not support the second raw property for the second destination child element;

in response to determining that the destination file type of the destination electronic document does not support the second raw property for the second destination child element, retrieving, by the processor executing the destination application, instructions to determine the second concrete property of the second source child element based on the second raw property from the second clipboard data on the clipboard;

pasting, by the processor executing the destination application, the retrieved second concrete property into the destination electronic document for the second destination child element; and rendering, based on the pasted second concrete property of the second destination child element, the destination electronic document on the display.

2. The method of claim 1, wherein the first source child element comprises a table.

3. The method of claim 2, wherein the table comprises a plurality of cells arranged in a rectangular grid, wherein the first raw property is associated with at least one first cell among the cells, and wherein the first concrete property of the first source child element is determined based on a position of the first cell within the rectangular grid.

4. The method of claim 3, further comprising:
receiving, by the processor, a user input to modify the pasted first clipboard data in the destination electronic document;

executing, by the processor, the instructions of the first raw property from the modified first clipboard data to determine a third concrete property of the first destination child element that is different from the first concrete property of the first destination child element; and rendering, based on the third concrete property of the first destination child element, the destination electronic document on the display.

5. The method of claim 4, wherein the user input to modify the pasted first clipboard data comprises a user input to modify a number of cells in the table.

6. The method of claim 3, wherein the first concrete property is determined based on a third concrete property of at least one second cell among the cells within the rectangular grid.

7. The method of claim 3, wherein the first concrete property is determined based on a position of the first cell relative to at least one second cell among the cells within the rectangular grid.

8. A system comprising:
at least one memory that stores operations for a source application and a destination application; and
at least one processor configured to execute the operations to:
receive, by the processor executing the operations of the source application, a user input to copy a first source child element of a source electronic document that is edited by the source application, wherein a source file type of the source electronic document supports a first raw property for the first source child element, wherein the first raw property has a conditional or an inheritance behavior that is based on a first source parent element of the source electronic document, and wherein the conditional or the inheritance behavior of the first raw property is used to determine a first concrete property of the first source child element for rendering the source electronic document on a display;

in response to the receipt of the user input to copy the first source child element, place, by the processor executing the operations of the source application, first clipboard data on a clipboard without placement of the first concrete property of the first source child element on the clipboard, wherein the first clipboard data comprises the first raw property and the source file type;

receive, by the processor executing the operations of the destination application, a user input to paste the first source child element as a first destination child element into a destination electronic document that is edited by the destination application;

determine, by the processor executing the operations of the destination application, that a destination file type of the destination electronic document supports the first raw property for the first destination child element, wherein the first raw property has a conditional or an inheritance behavior that is based on a first destination parent element of the destination electronic document, wherein the conditional or the inheritance behavior of the first raw property is used to determine a first concrete property of the first destination child element for rendering the destination electronic document on the display, and wherein the destination file type is different from the source file type;

paste, by the processor executing the operations of the destination application, the first clipboard data into the destination electronic document for the first destination child element, wherein the pasted first clipboard data preserves the conditional or the inheritance behavior of the first raw property for the first destination child element;

execute, by the processor executing the operations of the destination application without embedment of a full version of the source application in the destination application, instructions of the first raw property from the pasted first clipboard data to determine the first concrete property of the first destination child element;

render, based on the determined first concrete property of the first destination child element, the destination electronic document on the display;

receive, by the processor executing the operations of the source application, a user input to copy a second source child element of the source electronic document, wherein the source file type of the source electronic document supports a second raw property for the second source child element, wherein the second raw property has a conditional or an inheritance behavior that is based on a second source parent element of the source electronic document, and wherein the conditional or the inheritance behavior of the second raw property is used to determine a second concrete property of the second source child element for rendering the source electronic document on the display;

in response to the receipt of the user input to copy the second source child element, place, by the processor executing the operations of the source application, second clipboard data on the clipboard without placement of the second concrete property of the second source child element on the clipboard, wherein the second clipboard data comprises the second raw property and the source file type;

receive, by the processor executing the operations of the destination application, a user input to paste the second source child element as a second destination child element into the destination electronic document;

determine, by the processor executing the operations of the destination application, that the destination file type of the destination electronic document does not support the second raw property for the second destination child element;

in response to the determination that the destination file type of the destination electronic document does not support the second raw property for the second destination child element, retrieve, by the processor executing the operations of the destination application, instructions to determine the second concrete property of the second source child element based on the second raw property from the second clipboard data on the clipboard;

paste, by the processor executing the operations of the destination application, the retrieved second concrete property into the destination electronic document for the second destination child element; and render, based on the pasted second concrete property of the second destination child element, the destination electronic document on the display.

9. The system of claim 8, wherein the first source child element comprises a table.

10. The system of claim 9, wherein the table comprises a plurality of cells arranged in a rectangular grid, wherein the first raw property is associated with at least one first cell among the cells, and wherein the first concrete property of the first source child element is determined based on a position of the first cell within the rectangular grid.

11. The system of claim 10, wherein the processor is further to execute the operations to:

receive a user input to modify the pasted first clipboard data in the destination electronic document;

execute the instructions of the first raw property from the modified first clipboard data to determine a third concrete property of the first destination child element that is different from the first concrete property of the first destination child element; and render, based on the third concrete property of the first destination child element, the destination electronic document on the display.

12. The system of claim 11, wherein the user input to modify the pasted first clipboard data comprises a user input to modify a number of cells in the table.

13. The system of claim 10, wherein the first concrete property is determined based on a third concrete property of at least one second cell among the cells within the rectangular grid.

14. The system of claim 10, wherein the first concrete property is determined based on a position of the first cell relative to at least one second cell among the cells within the rectangular grid.

15. A non-transitory computer-readable medium having operations stored therein that, when executed by at least one processor, cause the processor to:

receive, by the processor executing the operations of a source application, a user input to copy a first source child element of a source electronic document that is edited by the source application, wherein a source file type of the source electronic document supports a first raw property for the first source child element, wherein the first raw property has a conditional or an inheritance behavior that is based on a first source parent element of the source electronic document, and wherein the conditional or the inheritance behavior of the first raw property is used to determine a first concrete property of the first source child element for rendering the source electronic document on a display;

in response to the receipt of the user input to copy the first source child element, place, by the processor executing the operations of the source application, first clipboard data on a clipboard without placement of the first concrete property of the first source child element on the clipboard, wherein the first clipboard data comprises the first raw property and the source file type;

receive, by the processor executing the operations of a destination application, a user input to paste the first source child element as a first destination child element into a destination electronic document that is edited by the destination application;

determine, by the processor executing the operations of the destination application, that a destination file type of the destination electronic document supports the first raw property for the first destination child element, wherein the first raw property has a conditional or an inheritance behavior that is based on a first destination parent element of the destination electronic document, wherein the conditional or the inheritance behavior of the first raw property is used to determine a first concrete property of the first destination child element for rendering the destination electronic document on the display, and wherein the destination file type is different from the source file type;

paste, by the processor executing the operations of the destination application, the first clipboard data into the destination electronic document for the first destination child element, wherein the pasted first clipboard data preserves the conditional or the inheritance behavior of the first raw property for the first destination child element;

execute, by the processor executing the operations of the destination application without embedment of a full version of the source application in the destination application, instructions of the first raw property from the pasted first clipboard data to determine the first concrete property of the first destination child element;

render, based on the determined first concrete property of the first destination child element, the destination electronic document on the display;

receive, by the processor executing the operations of the source application, a user input to copy a second source child element of the source electronic document, wherein the source file type of the source electronic document supports a second raw property for the second source child element, wherein the second raw property has a conditional or an inheritance behavior that is based on a second source parent element of the source electronic document, and wherein the conditional or the inheritance behavior of the second raw property is used to determine a second concrete property of the second source child element for rendering the source electronic document on the display;

in response to the receipt of the user input to copy the second source child element, place, by the processor executing the operations of the source application, second clipboard data on the clipboard without placement of the second concrete property of the second source child element on the clipboard, wherein the second clipboard data comprises the second raw property and the source file type;

receive, by the processor executing the operations of the destination application, a user input to paste the second source child element as a second destination child element into the destination electronic document;

determine, by the processor executing the operations of the destination application, that the destination file type of the destination electronic document does not support the second raw property for the second destination child element;

in response to the determination that the destination file type of the destination electronic document does not support the second raw property for the second destination child element, retrieve, by the processor executing the operations of the destination application, instructions to determine the second concrete property of the second source child element based on the second raw property from the second clipboard data on the clipboard;

paste, by the processor executing the operations of the destination application, the retrieved second concrete property into the destination electronic document for the second destination child element; and render, based on the pasted second concrete property of the second destination child element, the destination electronic document on the display.

16. The computer-readable medium of claim 15, wherein the first source child element comprises a table, wherein the table comprises a plurality of cells arranged in a rectangular grid, wherein the first raw property is associated with first cell among the cells, and wherein the first concrete property of the first source child element is determined based on a position of the first cell within the rectangular grid.

17. The computer-readable medium of claim 16, wherein the processor is further to execute the operations to:

receive a user input to modify the pasted first clipboard data in the destination electronic document;

execute the instructions of the first raw property from the modified first clipboard data to determine a third concrete property of the first destination child element that is different from the first concrete property of the first destination child element; and render, based on the third concrete property of the first destination child element, the destination electronic document on the display.

18. The computer-readable medium of claim 17, wherein the user input to modify the pasted first clipboard data comprises a user input to modify a number of cells in the table.

19. The computer-readable medium of claim 16, wherein the first concrete property is determined based on a third concrete property of at least one second cell among the cells within the rectangular grid.

20. The computer-readable medium of claim 16, wherein the first concrete property is determined based on a position of the first cell relative to at least one second cell among the cells within the rectangular grid.

* * * * *